US012708914B1

(12) United States Patent
Osborne et al.

(10) Patent No.: US 12,708,914 B1
(45) Date of Patent: *Aug. 18, 2026

(54) BLOWER-ATTACHED PRODUCT APPLICATOR, AND METHOD FOR DISPENSING A PRODUCT INTO A MOVING AIRSTREAM

(71) Applicants: Joseph D. Osborne, Hickory, NC (US); Brad Forrest, Cary, NC (US)

(72) Inventors: Joseph D. Osborne, Hickory, NC (US); Brad Forrest, Cary, NC (US)

( * ) Notice: Subject to any disclaimer, the term of this patent is extended or adjusted under 35 U.S.C. 154(b) by 201 days.

This patent is subject to a terminal disclaimer.

(21) Appl. No.: 18/793,365

(22) Filed: Aug. 2, 2024

Related U.S. Application Data

(63) Continuation of application No. 18/112,742, filed on Feb. 22, 2023, now Pat. No. 12,053,793, which is a continuation of application No. 16/811,367, filed on Mar. 6, 2020, now Pat. No. 11,602,761, which is a continuation-in-part of application No. 16/746,200, filed as application No. PCT/US2018/042452 on Jul. 17, 2018, now abandoned.

(60) Provisional application No. 62/814,542, filed on Mar. 6, 2019.

(51) Int. Cl.
*B05B 7/24* (2006.01)
*B05B 7/10* (2006.01)

(52) U.S. Cl.
CPC .............. *B05B 7/2416* (2013.01); *B05B 7/10* (2013.01); *B05B 7/2408* (2013.01)

(58) Field of Classification Search
CPC ....... B05B 7/2416; B05B 7/10; B05B 7/2408; B05B 7/2478; B05B 7/066; A61L 9/14
USPC .......................................... 222/637; 239/403
See application file for complete search history.

(56) References Cited

U.S. PATENT DOCUMENTS

| | | | |
|---|---|---|---|
| 1,822,743 | A | 9/1931 | Mitchell |
| 1,899,749 | A | 2/1933 | Deutsch |
| 2,029,141 | A | 1/1936 | Warner |
| 2,610,433 | A | 9/1952 | Chisholm et al. |
| 3,102,691 | A | 9/1963 | Gall |
| 3,575,349 | A | 4/1971 | Stahl |
| 3,704,811 | A | 12/1972 | Harden |
| 4,256,241 | A | 3/1981 | Mesic |
| 4,474,327 | A | 10/1984 | Mattson et al. |
| 5,401,061 | A | 3/1995 | Yamashita |
| 6,409,097 | B1 | 6/2002 | McCauley |

(Continued)

OTHER PUBLICATIONS

Markthomasbuilder, Worx Universal Fit Gutter Cleaning Kit Review-WA4092, Nov. 18, 2015 https://www.youtube.com/watch?v=nWGI-SdSo5s&t=1s.

*Primary Examiner* — Kevin Edward Schwartz
(74) *Attorney, Agent, or Firm* — Schwartz Law Firm, P.C.

(57) ABSTRACT

A product applicator is secured to the blower tube of a portable air blower and incorporates an adapter nozzle assembly and product storage container. The adapter nozzle assembly is located at a distal end of the blower tube, and includes a substantially hollow tubular housing and a discharge nozzle located inside the housing. The housing has a discharge end and a connecting end adapted for being arranged inline with the discharge airstream supplied by the blower. The product storage container is located proximate the housing, and is designed for storing a product to be discharged through the nozzle. A flow regulator is adapted for selectively adjusting a supply of product from the container to the discharge nozzle.

18 Claims, 17 Drawing Sheets

(56) References Cited

U.S. PATENT DOCUMENTS

| | | | |
|---|---|---|---|
| 6,837,447 B1 | 1/2005 | Clark | |
| 7,065,944 B1 | 6/2006 | Steele | |
| 7,487,889 B2 | 2/2009 | Owens | |
| 8,728,032 B2 | 5/2014 | Ducharme | |
| 11,602,761 B1 * | 3/2023 | Osborne | F04D 29/705 |
| 12,053,793 B1 * | 8/2024 | Osborne | B05B 7/10 |
| 2011/0253805 A1 | 10/2011 | Lee | |
| 2018/0014525 A1 | 1/2018 | Bennington | |
| 2018/0207654 A1 | 7/2018 | Phua | |
| 2020/0047199 A1 | 2/2020 | Holznagel | |
| 2020/0222923 A1 | 7/2020 | Osborne | |

* cited by examiner

BLOWER-ATTACHED PRODUCT APPLICATOR, AND METHOD FOR DISPENSING A PRODUCT INTO A MOVING AIRSTREAM

TECHNICAL FIELD AND BACKGROUND OF THE DISCLOSURE

The present disclosure relates broadly and generally to a blower-attached product applicator, and method for dispensing a product into a moving airstream. In exemplary embodiments, the disclosure comprises a universal liquid dispenser attachment designed for ready and convenient attachment to a standard lawn blower. This invention is an improvement to current means and methods for applying any product that lends itself to aerial application. More specifically, this invention enables any device which produces an adequate airflow to, in addition to such devices intended function, now serve as an applicator/dispenser of liquids. Simply by combining the invention with a forced-air source the invention delivers a variable flow rate and variable droplet size product.

Currently available means for dispensing liquids in conjunction with forced-air producing devices utilize devices that are solely dedicated to that purpose. This results in the need for the consumer to possess multiple devices. Currently available devices that perform tasks similar to the invention are typically constituted as a heavy, backpack-style blowers with permanently installed reservoir, tubing, valves, etc. As one example, the consumer who wants to efficiently blow leaves as well as apply aerial liquids needs to possess multiple blower devices. Further, existing similar devices utilize a fixed, single reservoir for containing the liquid that is to be dispensed. The single, fixed reservoir setup requires the cumbersome process of tipping the entire device to empty existing contents when not in use or when it is necessary to switch to another liquid. The process of emptying and filling these open-system reservoirs often results in spillage of the liquid.

In exemplary embodiments, the present applicator allows for a single forced-air blower to more efficiently serve the dual purpose as a supplier of forced-air for the invention as well as its intended purpose as a conventional blower. By introducing the present applicator into the airstream produced by another device, the combination of the two eliminates the need for having separate blowers for tasks such as, but not limited to, blowing leaves and dispensing liquids. The present applicator utilizes interchangeable, closed-system storage reservoirs for liquids to be dispensed. This provides for ease of changing liquids. The likelihood of spills is greatly reduced due to the spill resistant, closed-system design of the reservoir. The applicator's interchangeable reservoir capability also facilitates storage and inventory of multiple products to be dispensed.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a combination portable air blower and product applicator. The air blower is adapted for supplying a high velocity discharge airstream through an elongated blower tube. The product applicator is secured to the air blower, and includes an adapter nozzle assembly and product storage container. The adapter nozzle assembly is located at a distal end of the blower tube, and comprises a substantially hollow elongated housing and a discharge nozzle located inside the housing. The housing has a discharge end and a connecting end adapted for being arranged inline with the discharge airstream supplied by the blower. The storage container is located proximate the housing to avoid interfering with control and operation of the blower, and is designed for storing a product (e.g., liquid or granular chemical) to be discharged through the nozzle. The product may comprise a pesticide, weed control solution, lawn fertilizer, or the like. Once discharged through the nozzle, the product may become entrained in a swirling airflow generated by the blower and broadcast outwardly in vapor form (e.g., mist), as liquid, or solid.

A suction hose has a first open end communicating with an interior of the housing upstream of the nozzle, and a second open end communicating with an interior of the product storage container. The second end of the suction hose is adapted for residing above a surface of the product stored inside the container. A supply hose has a first end fluidly connected to the discharge nozzle inside the housing, and a second open end communicating with the interior of the product storage container. The second end of the supply hose is adapted for extending below the surface of the product stored inside the container. The discharge airstream passes fluidly inline through the housing and across the first open end of the suction hose. Using Venturi and Bernoulli principles, a pressure differential is generated which urges the product outwardly from the container through the second open end of the supply hose to the discharge nozzle. From this discharge nozzle, the product is broadcast outwardly from the blower/applicator combination to a surrounding area.

According to another exemplary embodiment, the discharge nozzle of the adapter nozzle assembly comprises an elongated hollow nozzle shaft and nozzle tip.

According to another exemplary embodiment, an annular mounting disk is attached to the nozzle shaft adjacent the nozzle tip.

According to another exemplary embodiment, the mounting disk defines a plurality of annularly-spaced air holes.

According to another exemplary embodiment, a plurality of spaced apart radial swirl fins are located adjacent the discharge nozzle at the discharge end of the housing. The radial fins cooperate to swirl the high velocity discharge airstream passing from elongated blower tube through the adapter housing.

According to another exemplary embodiment, a second annular mounting disk is spaced apart from the first mounting disk on the nozzle shaft, and cooperates with the first mounting disk to sandwich the radial swirl fins therebetween.

According to another exemplary embodiment, at least one threaded bolt attaches the first and second mounting disks together on opposite ends of the radial swirl fins.

According to another exemplary embodiment, the product storage container defines a threaded access opening for receiving the (liquid or granular) product, and a removable complementary-threaded cap designed for sealably closing the access opening.

According to another exemplary embodiment, the product storage container is mounted directly to the housing.

According to another exemplary embodiment, the discharge end of the housing is constricted relative to the connecting end of the housing.

According to another exemplary embodiment, a diameter of the housing at the connecting end is greater than 20% larger than a diameter of the housing at the discharge end.

According to another exemplary embodiment, an intermediate universal connector is designed to reside between the product applicator and the distal end of the blower tube.

According to another exemplary embodiment, the universal connector comprises a flexible fabric sleeve adapted to slip over the distal end of the blower outlet tube.

According to another exemplary embodiment, the universal connector further comprises a rigid tubular insert integrally joined to the fabric sleeve and adapted to insert through the connecting end of the adapter housing.

In another exemplary embodiment, the present disclosure comprises a product applicator designed for attachment to a portable air blower.

In yet another exemplary embodiment, the product applicator is formed with the portable air blower in a single integrated unit.

In yet another exemplary embodiment, the present disclosure comprises a method for dispensing liquid pesticide (e.g., in vapor form) which utilizes a conventional handheld portable air blower. The exemplary method may employ Bernoulli and Venturi principles to generate a pressure differential sufficient to supply the pesticide from an attached container into the high velocity discharge airstream passing through the outlet tube of the blower.

In yet another exemplary embodiment, the present disclosure comprises a product applicator in combination with a portable air blower. The air blower is adapted for supplying a high velocity discharge airstream through an elongated generally tubular blower tube. The product applicator is secured to the air blower and comprises an adapter nozzle assembly and product storage container. The adapter nozzle assembly is located at a distal end of the blower tube, and includes a substantially hollow and generally tubular housing and a discharge nozzle located inside the housing. The housing has a discharge end and a connecting end adapted for being arranged inline with the discharge airstream supplied by the blower. The product storage container is located proximate the housing, and is designed for storing a product to be discharged through the nozzle. An air transfer conduit has a first open end communicating with an inside of the housing upstream of the nozzle, and a second open end communicating with an inside of the product storage container and adapted for residing above a surface of the product stored inside the container. A supply conduit has a first end fluidly connected to the discharge nozzle inside the housing, and a second open end communicating (directly or indirectly) with the inside of the product storage container at a point below the surface of the product stored inside the container. The discharge airstream passes inline through the housing and across the first open end of the air transfer conduit to generate a pressure differential which urges the product outwardly from the container through the second open end of the supply conduit to the discharge nozzle. A flow regulator is adapted for selectively adjusting a supply of product from the container through the supply conduit to the discharge nozzle.

The term "across" refers broadly herein to mean flowing past, beside, into, or through.

The term "conduit" refers broadly herein to any structure capable of directing or influencing a flow of fluid (such as air, gas or liquid) and/or wet or dry product.

According to another exemplary embodiment, a container cap is located at a mouth of the product storage container, and defines first and second spaced apart flow ports fluidly communicating with the air transfer conduit and the supply conduit.

According to another exemplary embodiment, a hollow air tube is located inside the product storage container and is attached to the container cap at the first flow port. The air tube fluidly communicates with the air transfer conduit to direct the flow of air between the inside of the product storage container and the blower tube.

According to another exemplary embodiment, a fluid release valve is located inside the product storage container and is attached to the container cap at the second flow port.

According to another exemplary embodiment, a flow manifold comprises first and second hollow manifold tubes extending through respective first and second flow ports of the container cap. The first manifold tube fluidly communicates with the air transfer conduit to direct the flow of air between the inside of the product storage container and the blower tube. The second manifold tube fluidly communicates with the supply conduit to direct the flow of product between the inside of the product storage container and the discharge nozzle.

According to another exemplary embodiment, the second manifold tube automatically opens the fluid release valve upon attachment of the product storage container to the housing.

According to another exemplary embodiment, the flow regulator comprises a first seal pin adapted for selectively controlling the flow of product through the fluid release valve to the supply conduit.

According to another exemplary embodiment, the flow regulator comprises a second seal pin adapted for selective controlling the flow of air between the inside of the product storage container and the blower tube.

According to another exemplary embodiment, the flow regulator further comprises a manual control knob adapted for selectively and simultaneously moving the first and second seal pins between open and closed positions, thereby controlling the supply of product from the container through the supply conduit to the discharge nozzle.

According to another exemplary embodiment, the supply conduit comprises a flexible hose.

According to another exemplary embodiment, at least one flexible expansion ring is located at the connecting end of the housing and is adapted to frictionally engage an inside wall of the blower tube to releasably secure the product applicator to the air blower.

According to another exemplary embodiment, a rotatable internally-threaded control ring is located adjacent the flexible expansion ring and is designed to travel along an exterior thread of the housing to selectively compress the expansion ring, thereby adjusting an outside diameter of the expansion ring and selectively urging the expansion ring against the inside wall of the blower tube.

According to another exemplary embodiment, a plurality of spaced apart radial swirl fins located adjacent the discharge nozzle at the discharge end of the housing.

According to another exemplary embodiment, the product storage container is releasably mounted directly to the housing.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
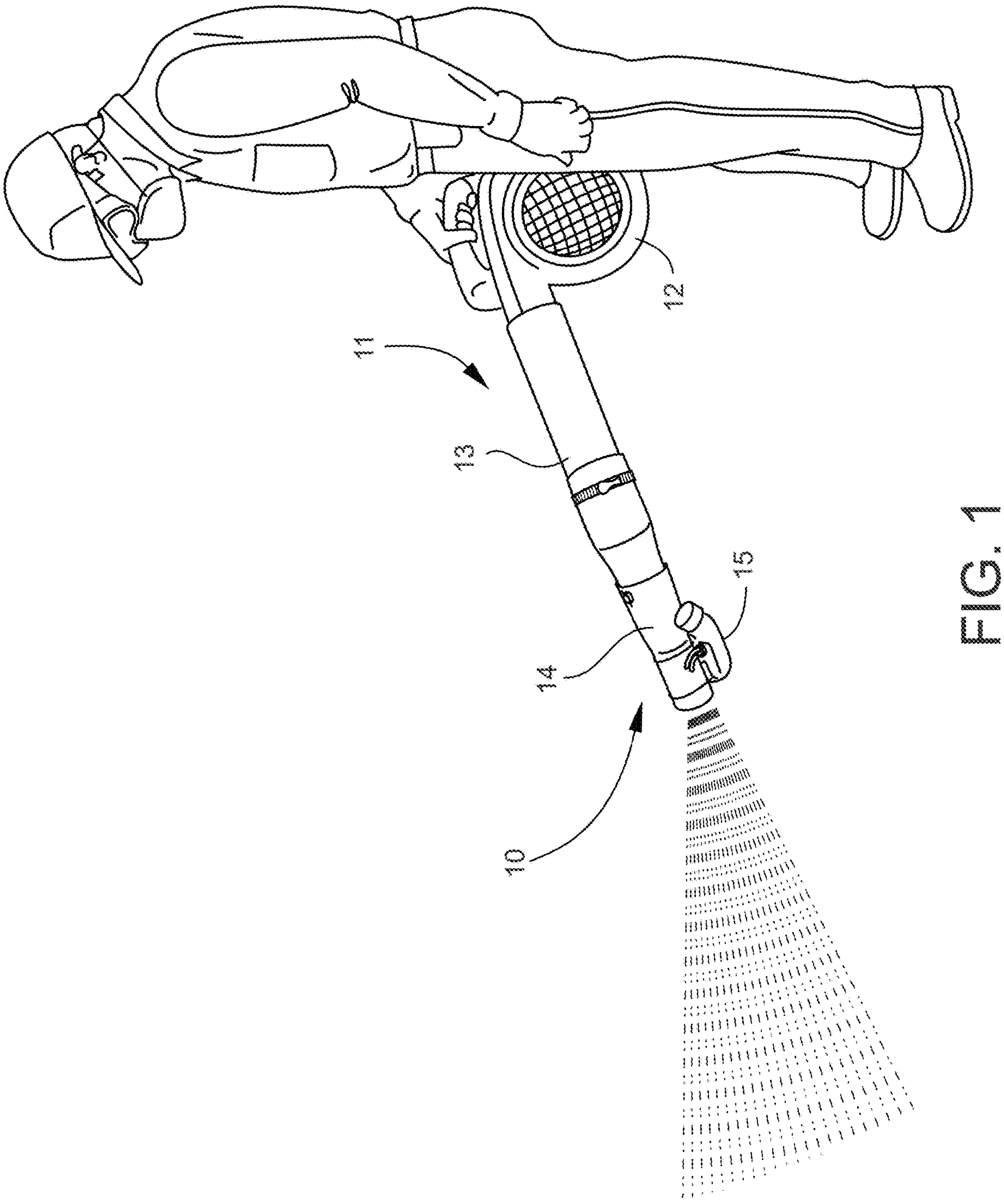
FIG. 1 is an environmental view demonstrating application of the present blower-attached product applicator according to one exemplary embodiment.
Figure 2:
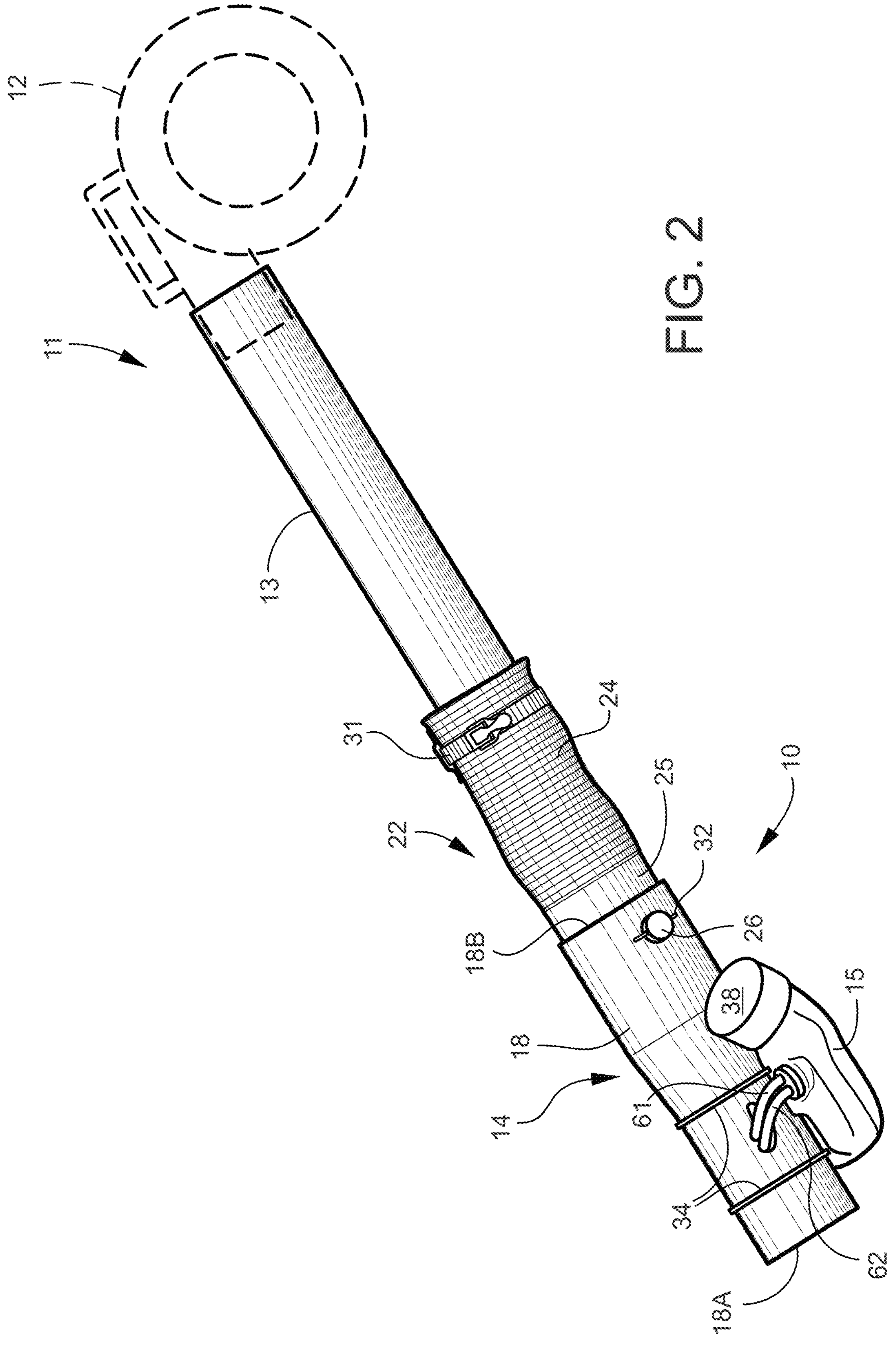
FIG. 2 is perspective view showing the product applicator operatively attached to the distal end of a standard blower tube, and employing the exemplary universal connector.
Figure 3:
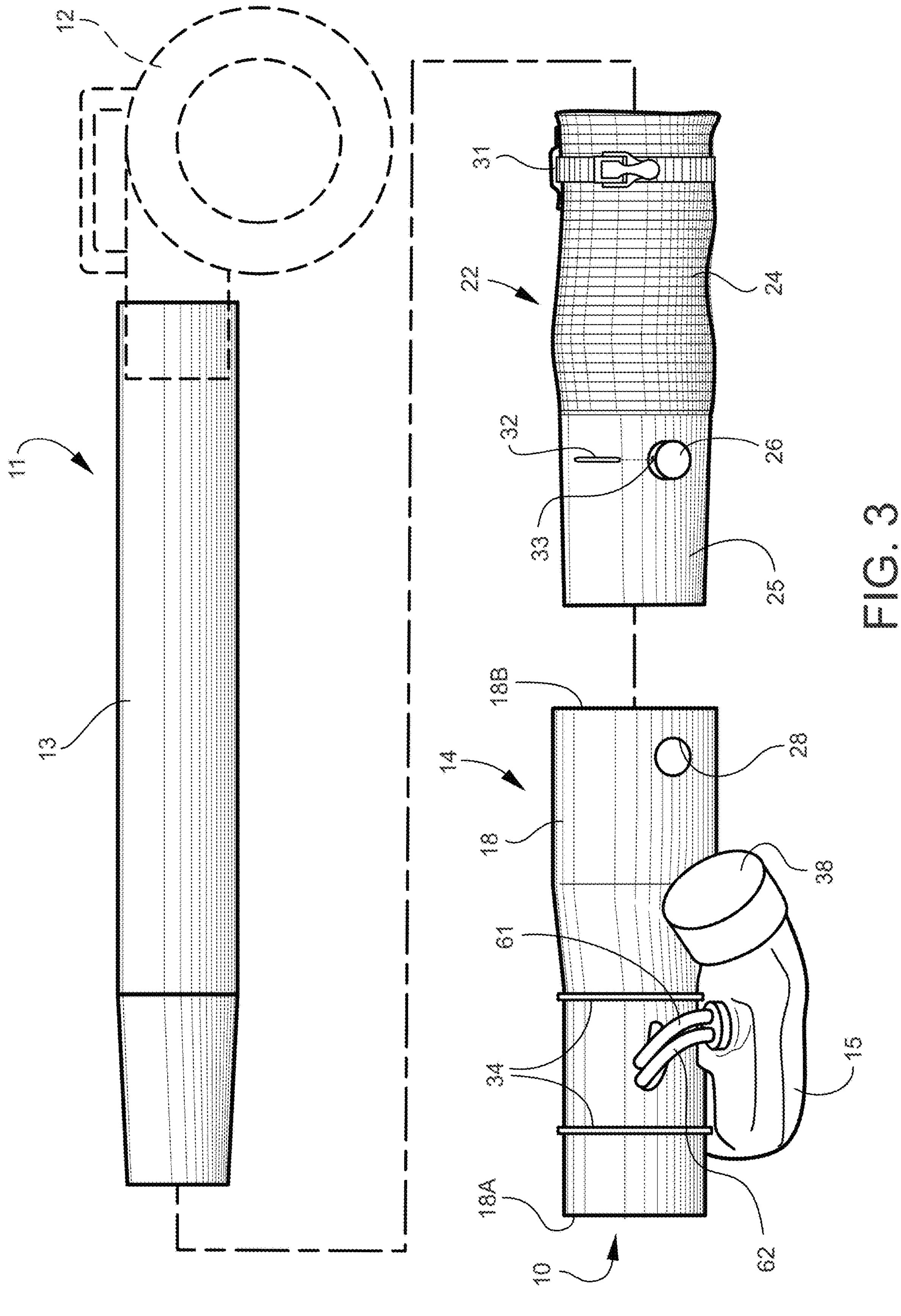
FIG. 3 is an exploded view illustrating the blower tube, universal connector, and exemplary product applicator.
Figure 4:
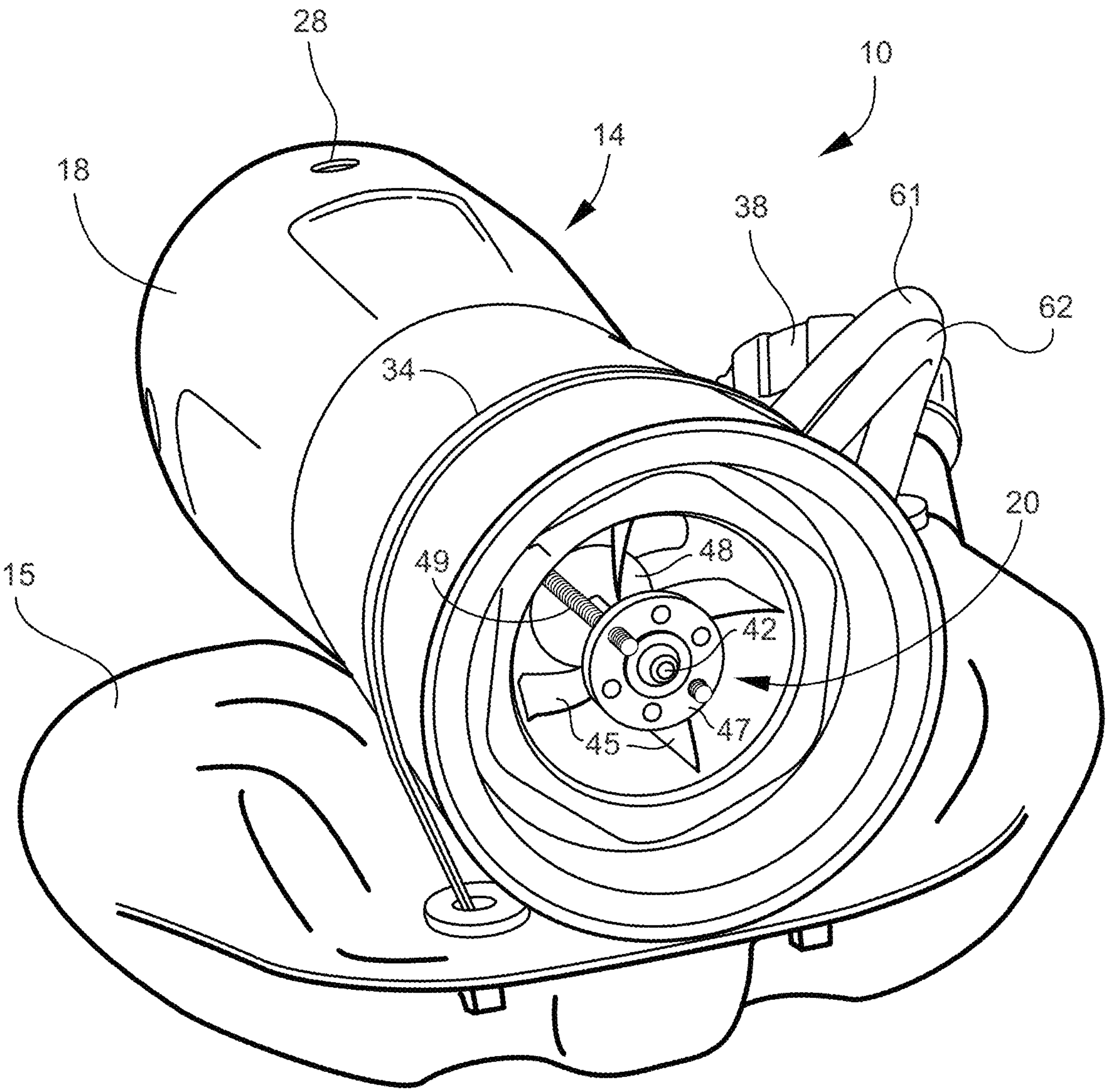
FIG. 4 is a further perspective view of the exemplary blower-attached product applicator with the storage container and adapter nozzle assembly attached together.

Referring now specifically to the drawings, a blower-attached product applicator according to one exemplary embodiment of the present disclosure is illustrated in FIG. 1, and shown generally at broad reference numeral 10. The exemplary applicator 10 is designed for attachment to a standard handheld portable air blower 11, and is utilized by an operator to safely and efficiently broadcast a liquid, gaseous or granular product to a surrounding area. In one exemplary application, the product comprises a liquid chemical pesticide. In alternative applications, the product may include liquid or granular fertilizer, weed control solution, dry or wet lawn seed, or other related lawn or garden product.

Portable air blowers, such as blower 11, are commonly known in the art, and typically comprise a lightweight plastic body 12 incorporating a motor-driven impeller for drawing air into the housing and for expelling that air through an elongated outlet blower tube 13 at a relatively high flow rate. The impeller may be driven using an electric or gasoline motor. One example of a prior art portable air blower is provided in U.S. Pat. No. 6,468,053 owned by Andreas STIHL AG and Co KG. The complete disclosure of this prior patent is incorporated herein by reference.

As best shown in FIGS. 2-5, the present blower-attached applicator 10 comprises an adapter nozzle assembly 14 and attached storage container 15. The nozzle assembly 14 is located at a distal end of the blower tube 13, and includes a substantially hollow elongated housing 18 and a discharge nozzle 20 located inside the housing 18. The adapter housing 18 is arranged inline with the discharge airstream supplied by the blower 11, and has an open discharge end 18A and an open connecting end 18B. In the exemplary design, the housing tapers slightly at its mid-section and is constricted at its open discharge end 18A relative to the connecting end 18B, such that the velocity of airflow through the discharge end 18A is greater that the velocity at the connecting end 18B. For example, the diameter of the housing 18 at the connecting end 18B may be greater than 20% larger than a diameter of the housing 18 at the discharge end 18A.

In the embodiment show, an intermediate universal connector 22 resides between the product applicator 10 and the distal end of the blower tube 13, and is utilized to facilitate retrofit attachment of the exemplary applicator 10 to a variety of commercial air blowers 11 having different size and style outlet tubes. The universal connector 22 comprises a flexible rubber-lined fabric sleeve 24 adapted to slip over the distal end of the blower tube 13, and a rigid tubular and slightly tapered insert 25 integrally joined to the fabric sleeve 24. The tapered insert 25 is designed to closely fit inside the open connecting end 18B of the adapter housing 18, and comprises an annular integrally molded detent 26 which aligns and mates with a complementary hole 28 formed in the housing 18. The universal connector 22 is secured to the blower tube 13 by ratchet strap 31, and is releasably attached to the applicator housing 18 using a cotter pin 32 (or the like) extending laterally through a pin opening 33 in detent 26. In alternative embodiments, the product applicator 10 is integrally formed with the tube 13 of the air blower 11 as a single integrated unit.

The exemplary storage container 15 has a molded, generally U-shaped rigid construction and mounts directly beneath the applicator housing 18 using flexible plastic straps 34 or "zip ties." The container 15 includes a threaded access opening 36 (FIG. 5) for receiving the liquid pesticide or other product, and a removable complementary-threaded cap 38 for closing and sealing the access opening 36. Once discharged through the nozzle 20, as described below, the liquid pesticide becomes entrained in the airflow generated by the blower 11 and is broadcast outwardly from the operator in a low-volume mist.

Figure 5:
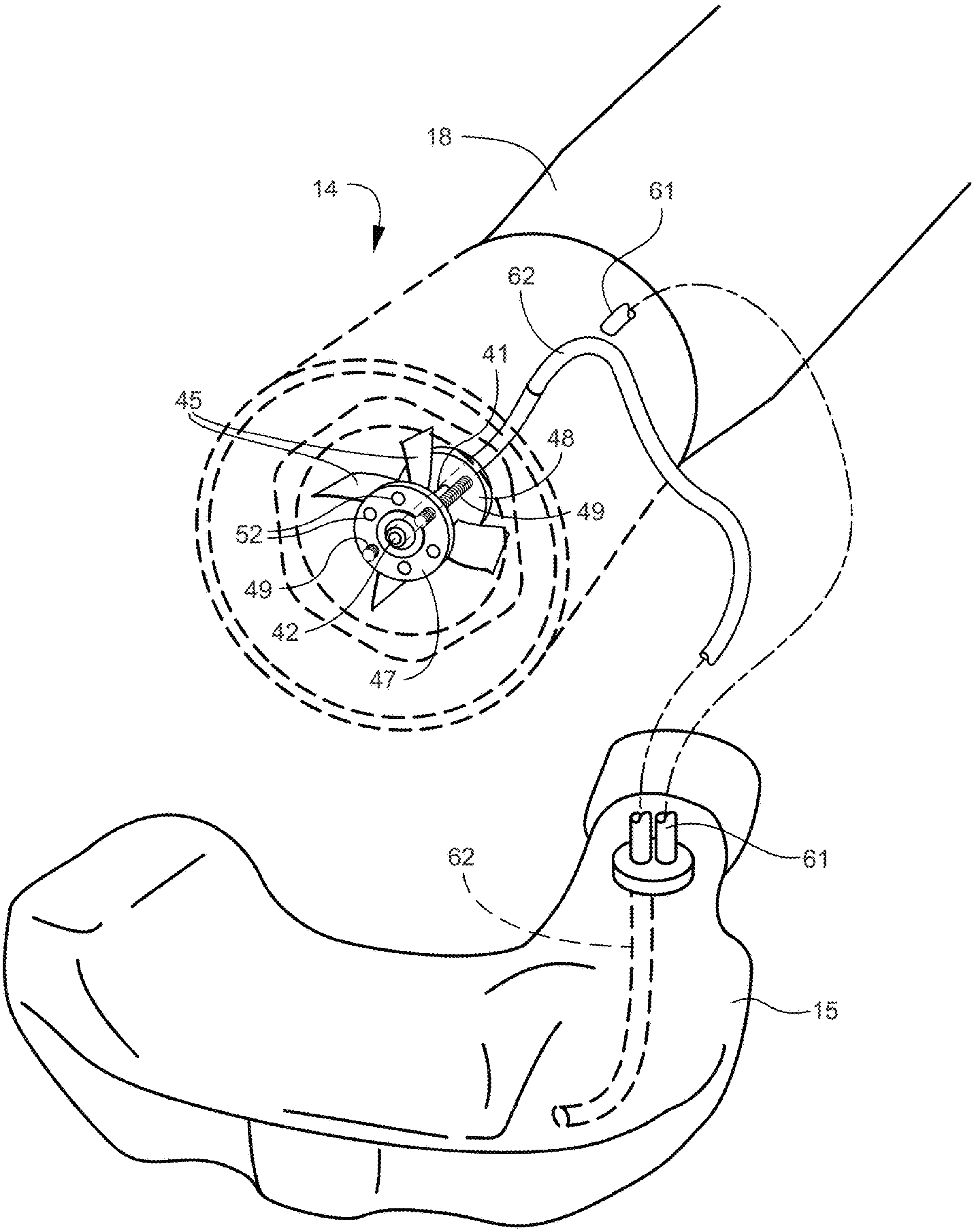
FIG. 5 is a perspective view showing the product storage container removed from the adapter nozzle assembly.
Figure 6:
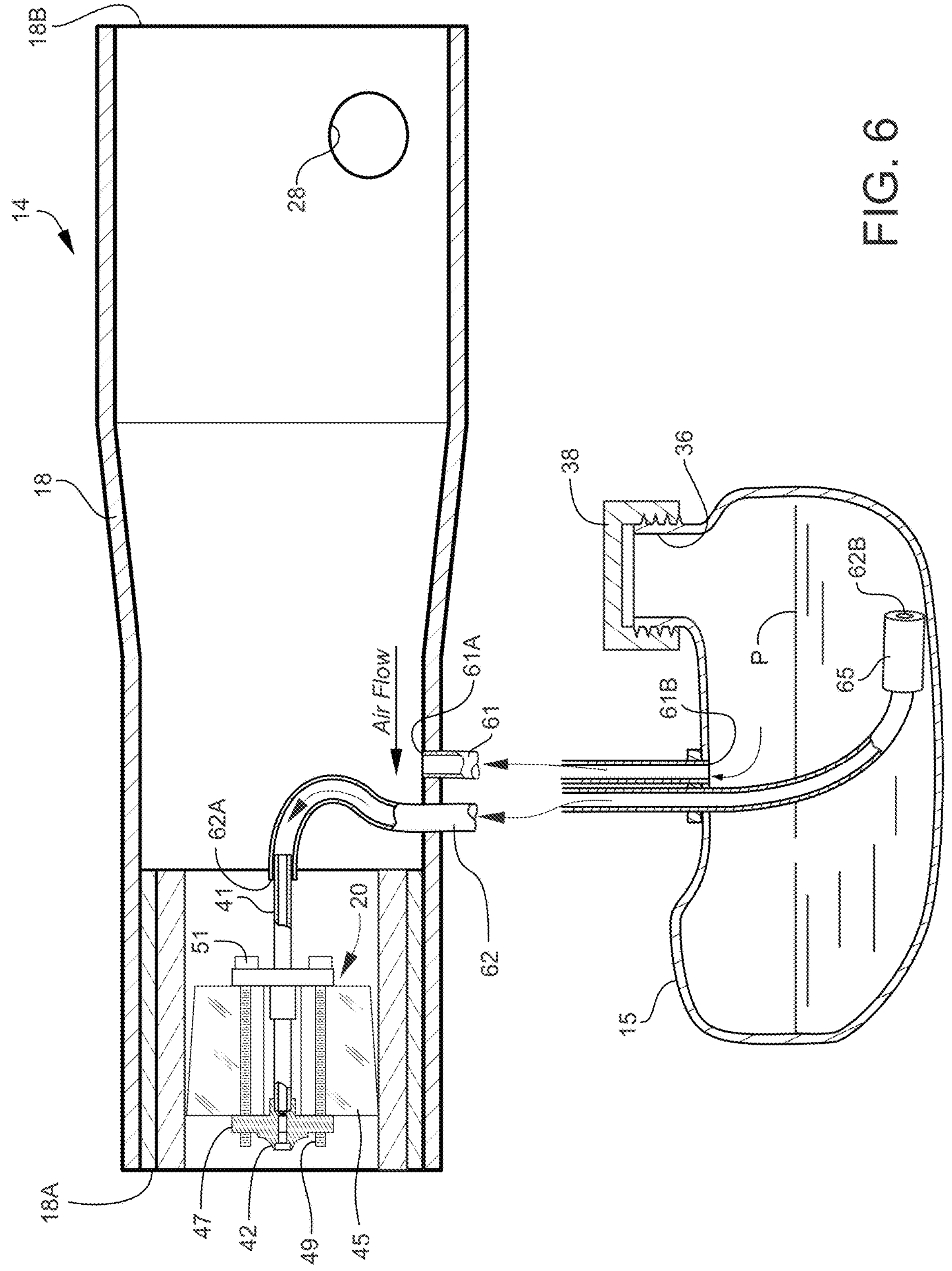
FIGS. 6 and 7 are schematic cross-sectional views demonstrating operation of the exemplary blower-attached product applicator
Figure 7:
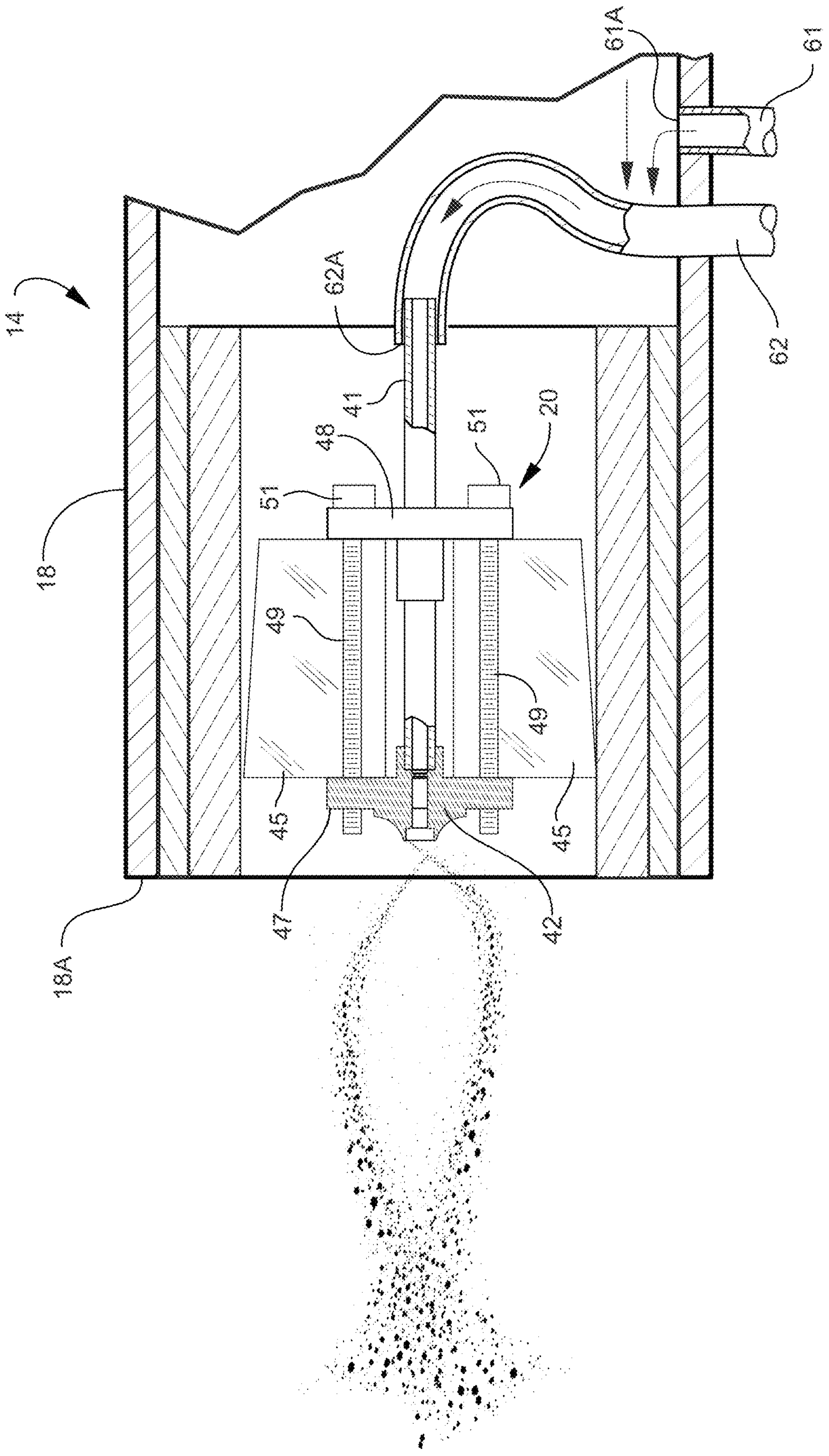

Referring to FIGS. 5, 6 and 7, the discharge nozzle 20 of the present adapter assembly 14 comprises an elongated hollow shaft 41 and nozzle tip 42 located at the discharge end 18A of the housing 18, and directly adjacent a number of fixed radial swirl fins 45. The radial fins 45 cooperate to swirl the high velocity laminar airstream passing from the outlet blower tube 13 and through the adapter housing 18. The nozzle tip 42 and shaft 41 are centrally-mounted on opposite ends of the swirl fins 45 by cooperating fixed and floating metal disks 47, 48 and threaded bolts 49. The bolts 49 extend through respective complementary-threaded holes in the fixed mounting disk 47 and when tightened function to adjustably urge the floating disk 48 into close contact with the fixed swirl fins 45. The floating disk 48 is retained by bolt heads 51. Additionally, the fixed mounting disk 47 may define a number of annularly-spaced air holes 52 which cooperate with swirl fins 45 to further disrupt the otherwise laminar air flow through the adapter housing 18.

As demonstrated in FIGS. 6 and 7, during operation of the blower 11 liquid pesticide is transferred from the storage container 15 to the adapter nozzle assembly 14 automatically using cooperating suction and supply hoses 61 and 62. The suction hose 61 has a first open end 61A which sealably communicates with an interior of the adapter housing 18 upstream of the discharge nozzle 20, and a second open end 61B sealably communicating with an interior of the storage container 15. The second end 61B of the suction hose 61 resides above a surface of the liquid pesticide "P" stored inside the container 15. The supply hose 62 has a first end 62A fluidly connected to the hollow shaft 41 of discharge nozzle 20, and a second open end 62B sealably communicating with the interior of the storage container 15. The second end 62B of the supply hose 62 extends downwardly below the surface of the liquid pesticide "P", and may be weighted to reside at the bottom of the container 15 using a cylindrical metal collar 65.

As the laminar high-velocity airstream passes inline through the adapter housing 18 and across the first open end 61A of the suction hose 61, a pressure differential is created (using Venturi and Bernoulli principles) which urges the liquid pesticide "P" outwardly from the storage container 15 through the second open end 62B of the supply hose 62 to the discharge nozzle 20. From the nozzle tip 42, the liquid pesticide "P" is captured and entrained in the swirling discharge airflow and broadcast outwardly from the blower/applicator combination to a surrounding area. In one embodiment, the discharge nozzle 20 dispenses the liquid pesticide in the form of very small droplets ranging in average size of 20-30 microns. The small pesticide droplets become entrained and suspended in the outwardly-swirling airflow, and convert into a cyclonic pesticide vapor applicable for destroying a wide range of flying insects.

A further exemplary embodiment of a blower-attached product applicator according to the present disclosure is illustrated in FIGS. 8-17. Like product applicator 10 described above, the exemplary applicator 100 is designed for attachment to a standard handheld portable air blower (such as blower 11), and is utilized by an operator to safely and efficiently broadcast a liquid, gaseous or granular product to a surrounding area. Other features of the exemplary product applicator 100 are similar to that previously described including the material construction of its component parts and basic principles of operation when used in combination with an air blower.

Figure 8:
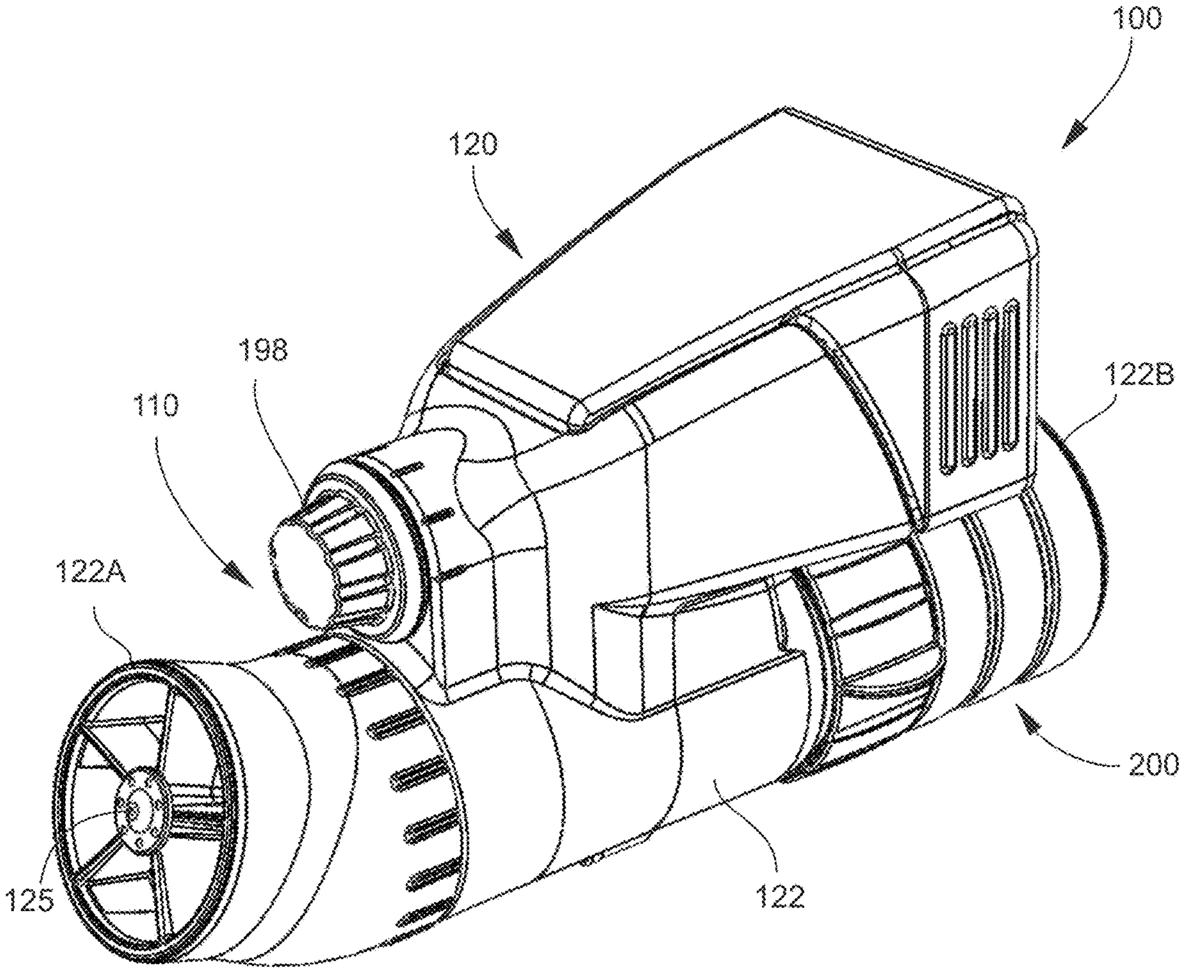
FIG. 8 is a perspective view a blower-attached product applicator according to a further exemplary embodiment of the present disclosure.
Figure 9:
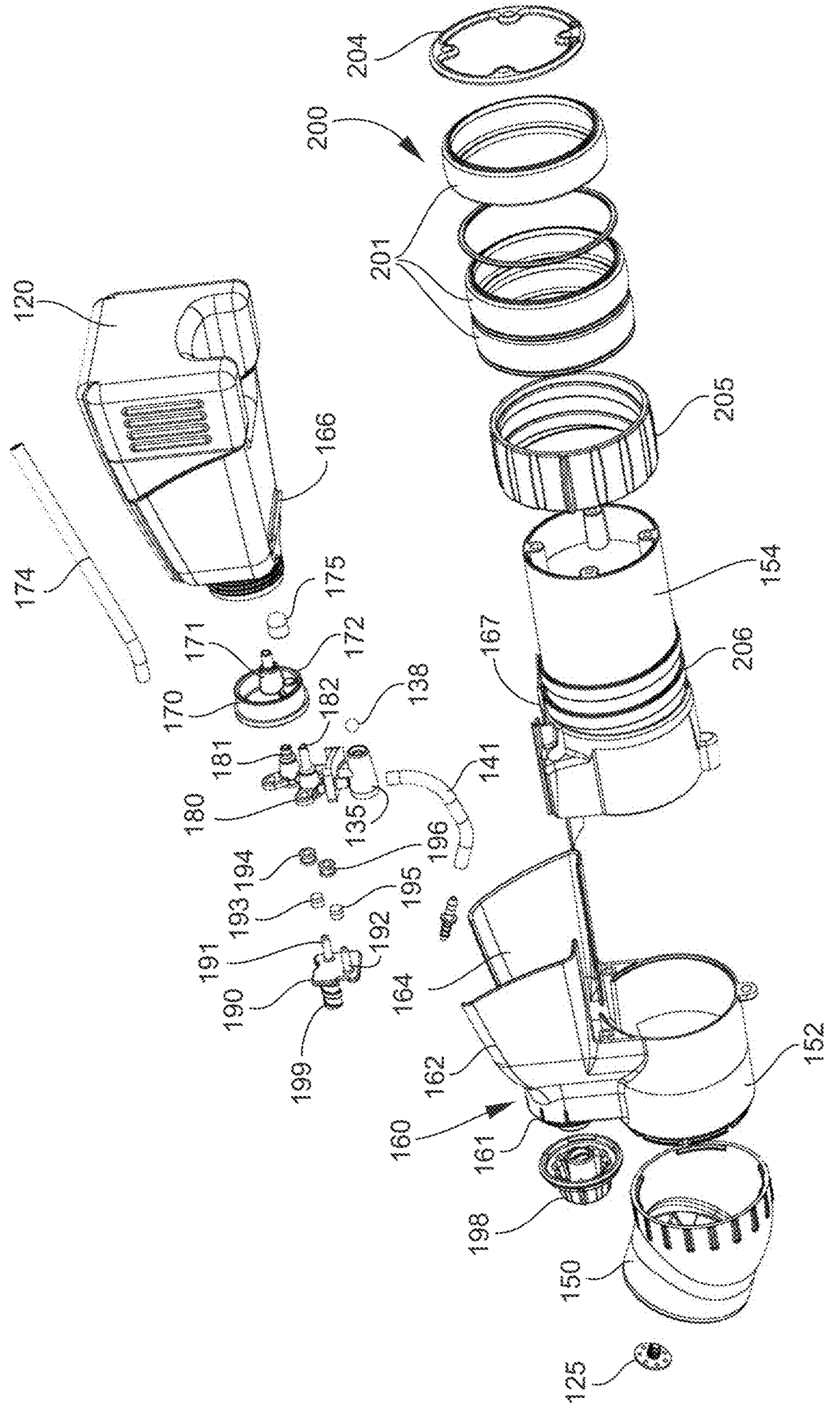
FIGS. 9 and 10 are exploded views of the exemplary product applicator.
Figure 10:
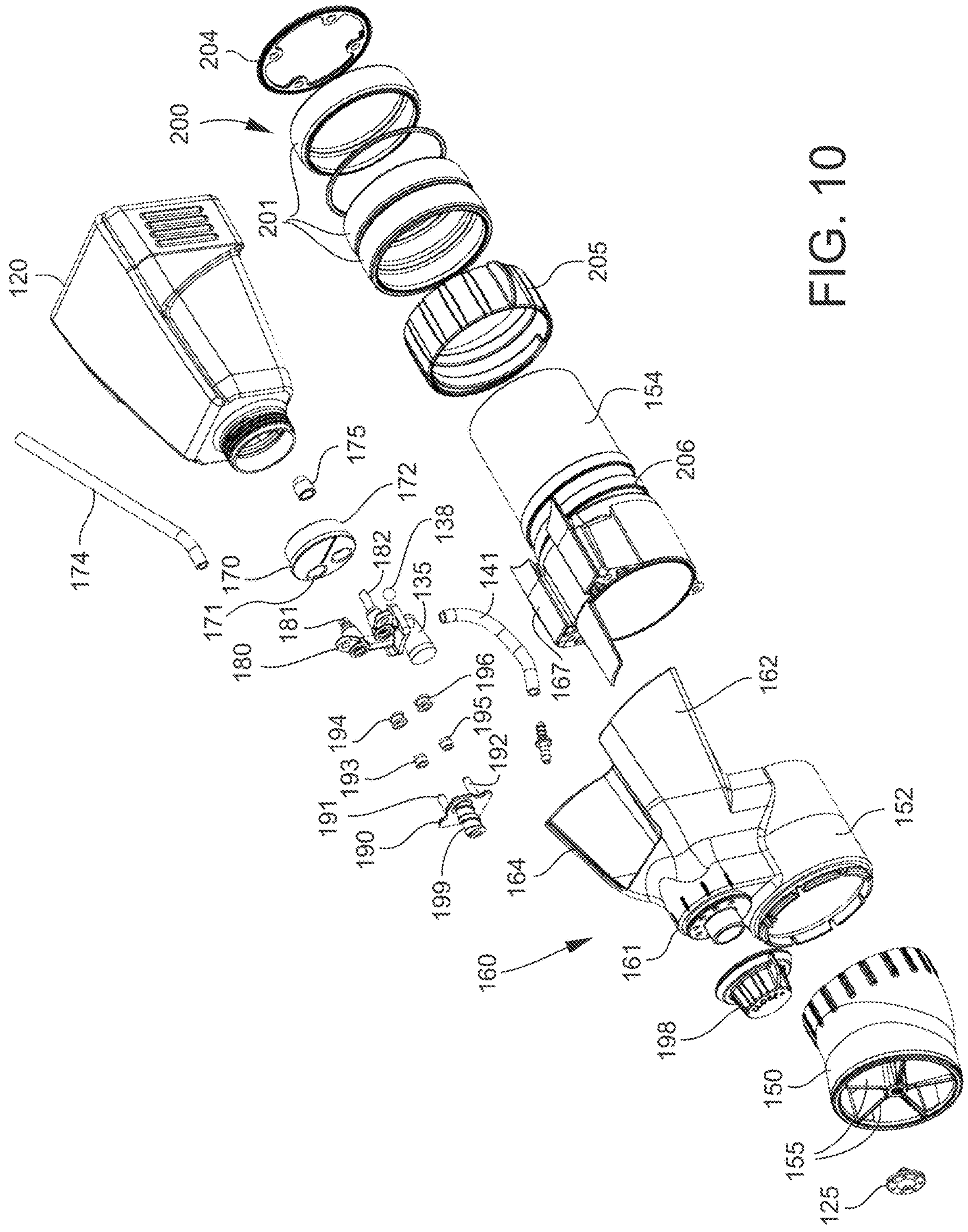

Referring to FIGS. 8, 9, and 10, the exemplary product applicator 100 comprises an adapter nozzle assembly 110 and a releasably attached product storage container 120. The nozzle assembly 110 is adapted for removable attachment to the distal end of a blower tube, such as blower tube 13 shown in FIG. 3. The exemplary nozzle assembly 110 includes a substantially hollow and generally tubular housing 122 and a metal discharge nozzle 125 located inside the housing 122. The tubular housing 122 is arranged inline with the discharge airstream supplied by the blower, and has an open discharge end 122A and an open connecting end 122B. The product storage container 120 is located proximate the tubular housing 122, and is designed for storing a product (e.g., liquid pesticide) to be discharged from the applicator 100 through the nozzle 125.

As best shown in FIGS. 11-14, the exemplary product applicator 100 comprises an internal air transfer conduit 131 and a supply conduct 132 which cooperate to direct the flow of product outwardly from the product storage container 120 through the tubular housing 122 to the discharge nozzle 125. The air transfer conduit 131 has a first open end 131A which communicates with an inside of the tubular housing 122 upstream of the nozzle 125, and a second open end 131B which communicates with an inside of the product storage container 120. The open end 131A of air transfer conduit 131 may comprise or incorporate a side-turned tapered air basket 135. The air basket 135 has a closed end wall 136 and an open mouth 137 facing the high-velocity laminar airflow generated by the blower. A steel ball 138 and coil spring 139 are located inside the air basket 135 and cooperate to maintain the air basket 135 in a normally closed condition, thereby restricting flow into and through the air transfer conduit. As high-velocity airflow generated by the blower moves through the tubular housing 122, the ball 138 retracts against the biasing force of the spring 139 thereby unblocking the mouth 137 of air basket 135 to allow entry of air into and through the air transfer conduit 131 to the product storage container 120.

The exemplary supply conduit 132 may comprise or incorporate a flexible hose 141 (FIGS. 11, 13, and 15), and has a first end 132A fluidly connected to the discharge nozzle 125 inside the housing 122, and a second open end 132B communicating (e.g., directly or indirectly) with the product storage container 120 at a point below the surface of the product stored inside the container 120. As discussed further below, as the laminar airstream generated by the blower passes inline through the tubular housing 122 and across the first open end 131A of the air transfer conduit 131, a pressure differential inside the otherwise sealed container 120 urges product outwardly from the container 120 through the second open end 132B of the supply conduit 132 and through the tubular housing 122 to the discharge nozzle 125.

As best shown in FIGS. 9 and 10, the exemplary tubular housing 122 may be formed in multiple interconnected sections-a slightly angled front section 150, an intermediate section 152, and a rear section 154. The front housing section 150 at discharge end 122A is snap-attached to the intermediate section 152 and is capable of rotating to adjust an orientation angle of the discharge nozzle 125. The front section 150 may further comprise spaced apart radial swirl fins 155 adjacent the discharge nozzle 125. As previously described, the radial fins 155 cooperate to swirl the high velocity laminar airstream passing outwardly from the tubular housing 122. The intermediate housing section 152 is attached to the rear section 154 using suitable fasteners (not shown), and comprises an integrally-molded container fitting 160 having a head end 161 and opposing inwardly turned side walls 162, 164. The inwardly-turned side walls 162, 164 are spaced apart and shaped to closely receive the exemplary product storage container 120. As the container 120 slides forward into position within the fitting 160, interfering shoulders 166, 167 located on an underside of the container 120 and a top side of intermediate housing section 152 cooperate to snap-attach the container 120 in place between the head end 161 and inwardly-turned side walls 162, 164.

A sealed container cap 170 is located at a mouth of the product storage container 120, and defines first and second spaced apart flow ports 171, 172 (FIGS. 9 and 10) fluidly communicating with the air transfer conduit 131 and the supply conduit 132, respectively. The air transfer conduit 131 incorporates a hollow air tube 174 located inside the product storage container 120, as shown in FIGS. 11-14, and having a proximal end attached to the container cap 170 at the first flow port 171. The air tube 174 extends outwardly and upwardly from the container cap 170 such that its open distal end locates above a surface of the stored product. The air tube 174 fluidly communicates with the remainder of air transfer conduit 131 to direct the flow of air between the inside of the product storage container 120 and the tubular housing 122. A slitted fluid release valve 175 is located inside the product storage container 120 and is attached to the container cap 170 at the second flow port 172.

Referring to FIGS. 9-14, an integrally-molded flow manifold 180 incorporates first and second hollow manifold tubes 181, 182 extending through respective first and second flow ports 171, 172 of the container cap 170. The first manifold tube 171 fluidly communicates with the air transfer conduit 131 to direct the flow of air between the inside of the product storage container 120 and housing 122. The second manifold tube 182 fluidly communicates with the supply conduit 132 to direct the flow of product between the inside of the product storage container 120 and the discharge nozzle 125. Upon sliding attachment of the product storage container 120 into the molded fitting 160, as described above, the manifold tube 182 penetrates and automatically opens the slitted fluid release valve 175 to allow entry of product into the manifold tube 182. See FIG. 16.

In exemplary embodiments, a flow regulator 190 comprising first and second seal pins 191, 192 functions to selectively control the flow of product outwardly from the product storage container 120. The first seal pin 191 comprises a rubber seal and seal cap 193, 194, and functions to selectively and adjustably control the flow of air from the air transfer conduit 131 through the manifold tube 171 and into the container 120. The second seal pin 192 likewise comprises a rubber seal 195 and seal cap 196, and functions to selectively and adjustably the flow of product outwardly from the container 120 into the supply conduit 132. An manual internally-threaded control knob 198 is carried on a complementary threaded post 199 of the flow regulator 190. When rotated the mating threads of the knob 198 and post 199 cause the flow regulator 190 to move inwardly and outwardly relative to the flow manifold 180. This inward and outward movement of flow regulator 190 simultaneously moves the first and second seal pins 191, 192 between open and closed positions, thereby controlling the supply of product from the container through the supply conduit 132 to the discharge nozzle 125.

The exemplary product applicator 100 may be operatively joined to the air blower by inserting the rear section 154 of tubular housing 122 into the open blower tube. The rear housing section 154 may carry a flexible expansion ring assembly 200 (or ring sleeve) comprising a series of resilient rubber rings 201 designed to compress along a length of the housing 122, thereby enlarging an outer diameter of the assembly 200. The exemplary expansion ring assembly 200 is held to the tubular housing 122 by a metal retainer ring 204 attached to the rear section 154 using suitable fasteners (not shown). A rotatable internally-threaded control ring 205 is located adjacent the flexible expansion rings 201 and is designed to travel along an exterior thread 206 of the housing 122. When rotated as demonstrated by arrow 210 in FIG. 17, the control ring 205 moves along thread 206 toward the end 122B of tubular housing 122 causing the series of rubber rings 201 to compress, thereby urging the expansion ring assembly 200 against the inside wall of the blower tube. The enlarged-diameter rubber rings 201 cooperate to further frictionally engage and adjustably secure the exemplary product applicator 100 to the blower tube of the air blower.

Figure 11:
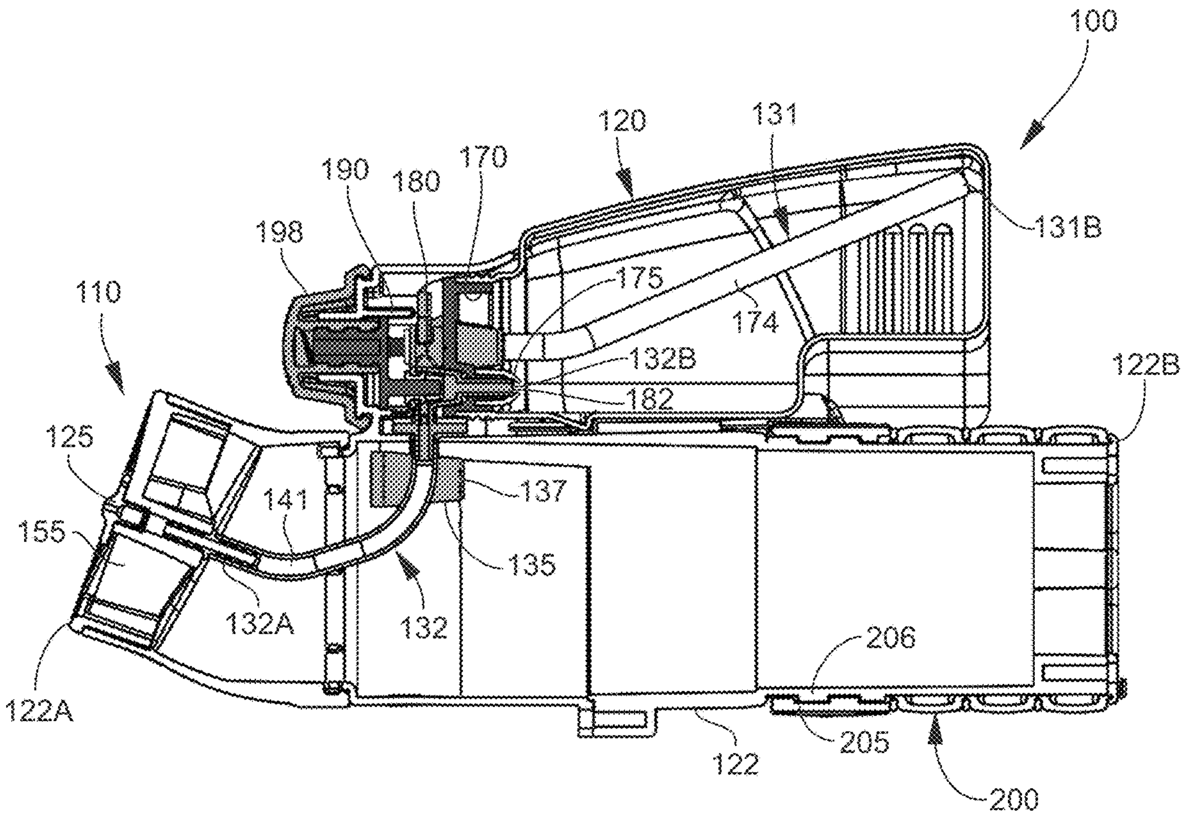
FIGS. 11-14 are cross-sectional views illustrating the flow regulator of the exemplary product applicator in fully open and sealed positions.
Figure 12:
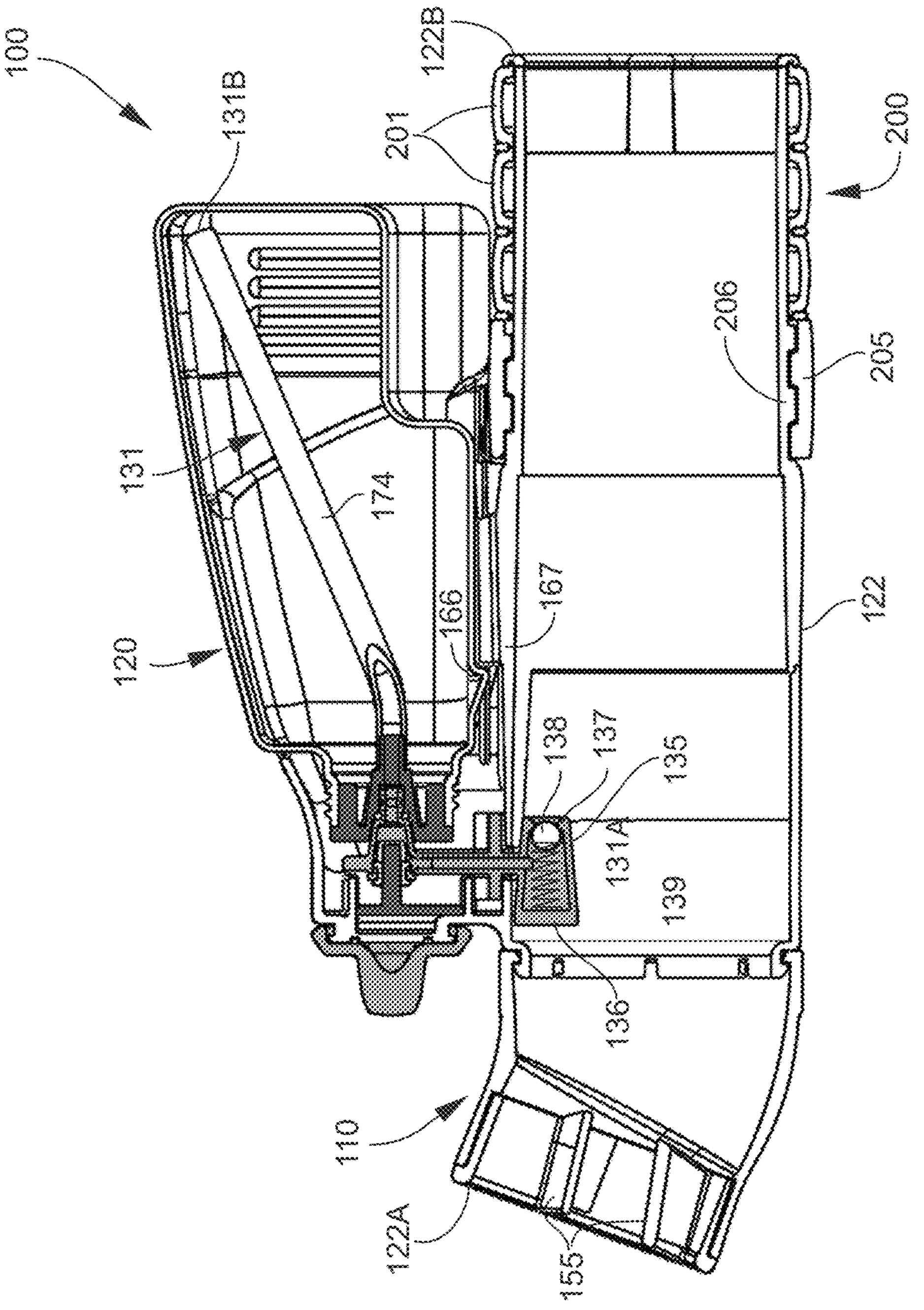
Figure 13:
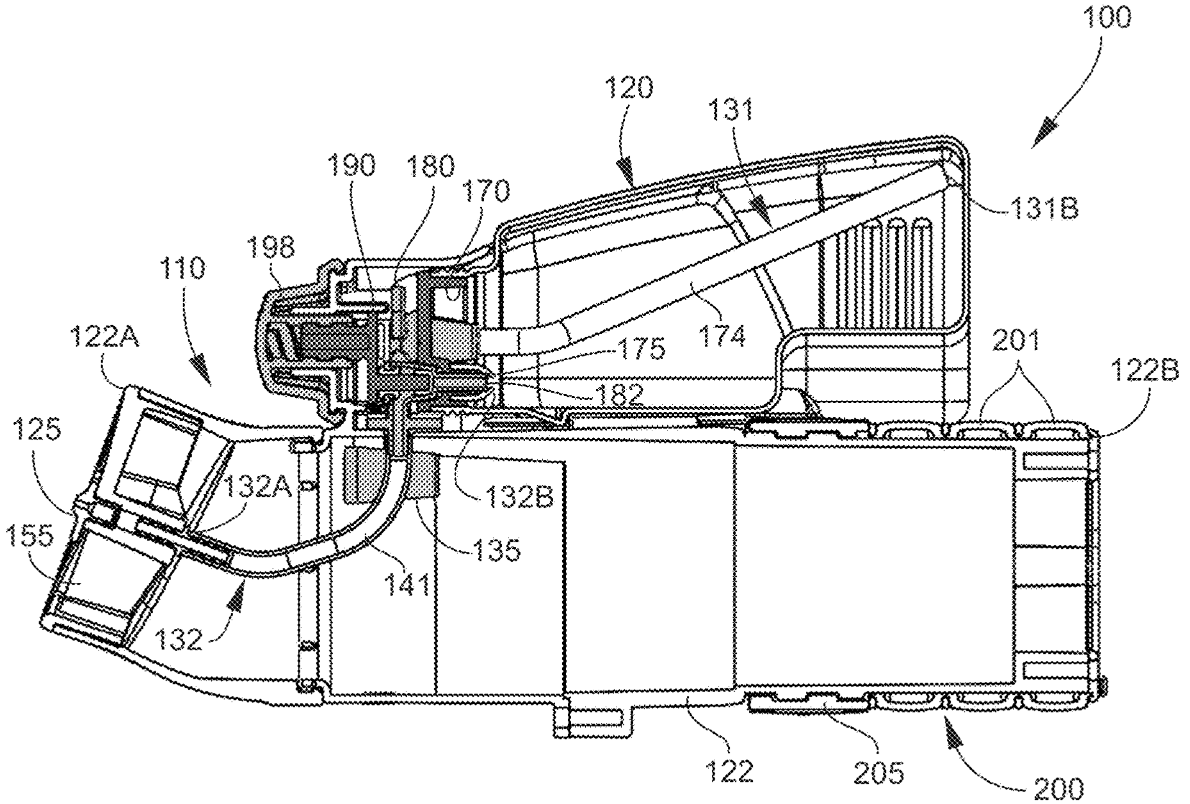
Figure 14:
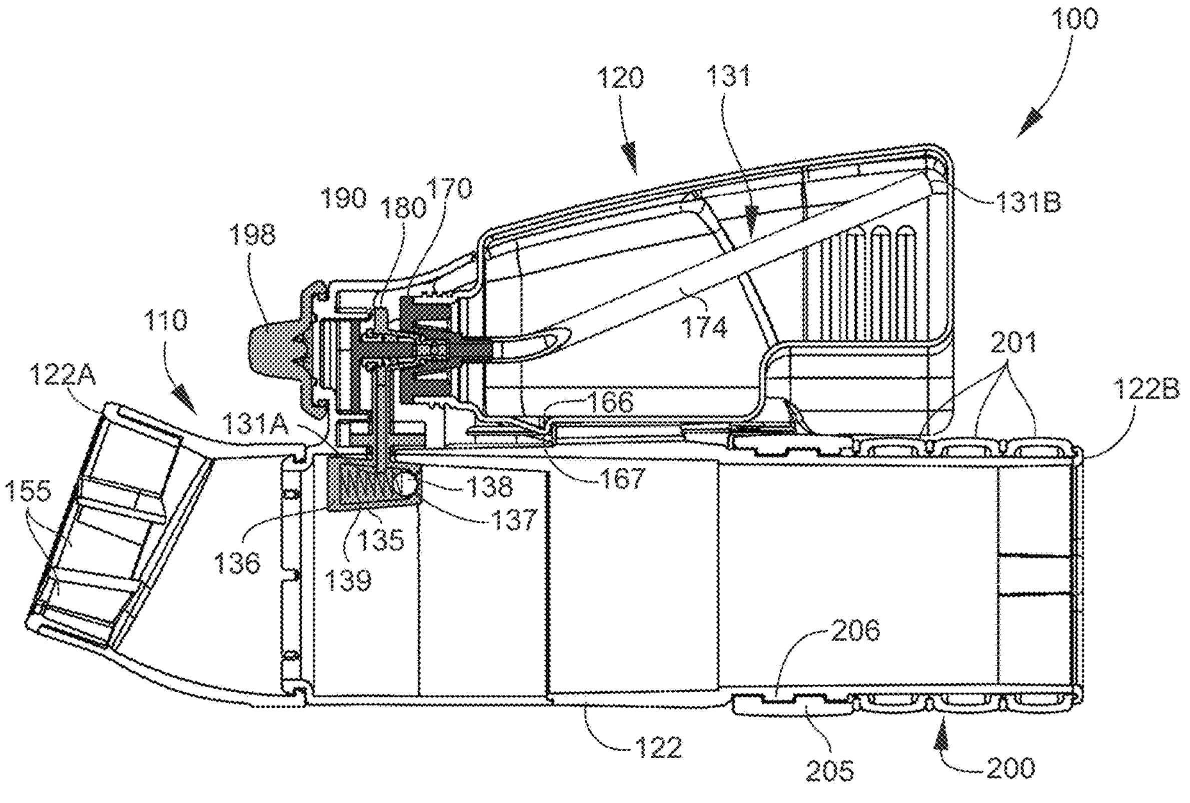
Figure 15:
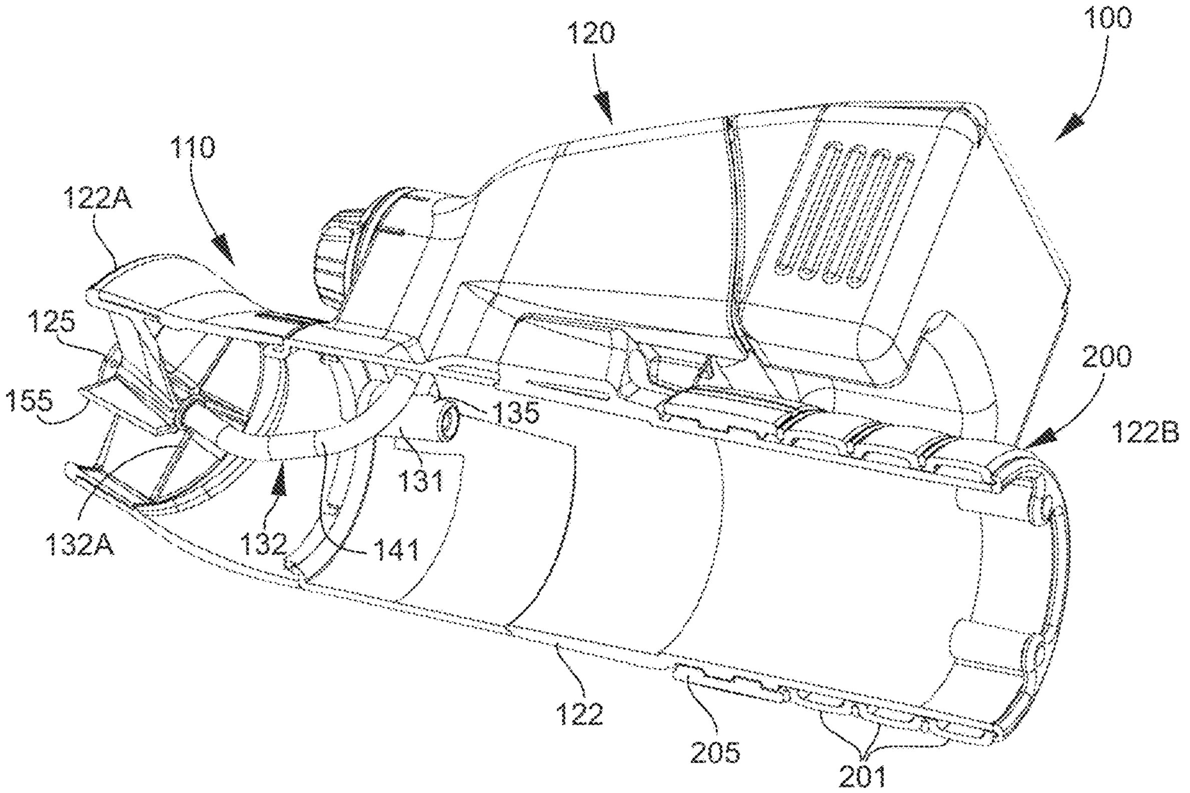
FIGS. 15 and 16 are fragmentary perspective views of the exemplary product applicator.
Figure 16:
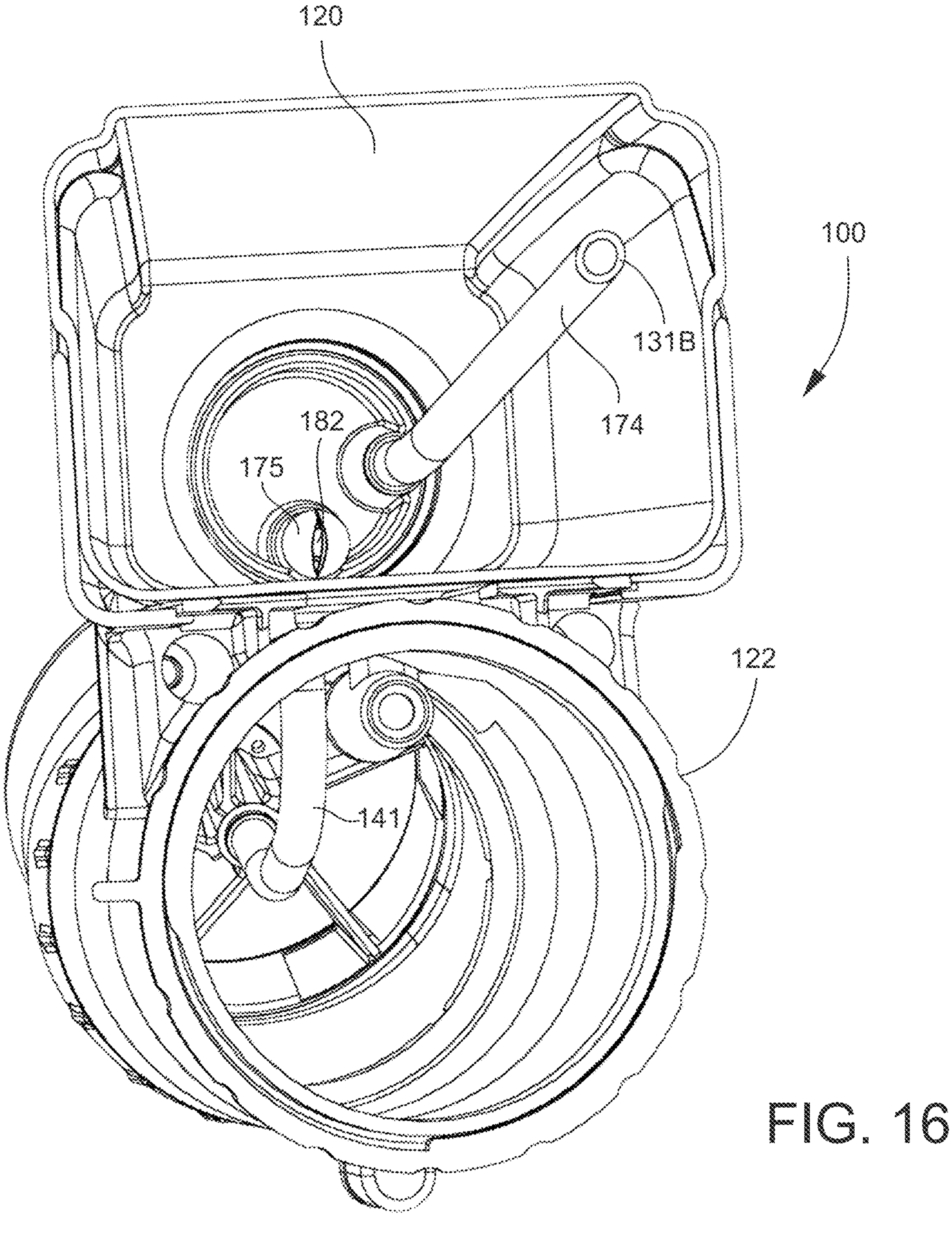
Figure 17:
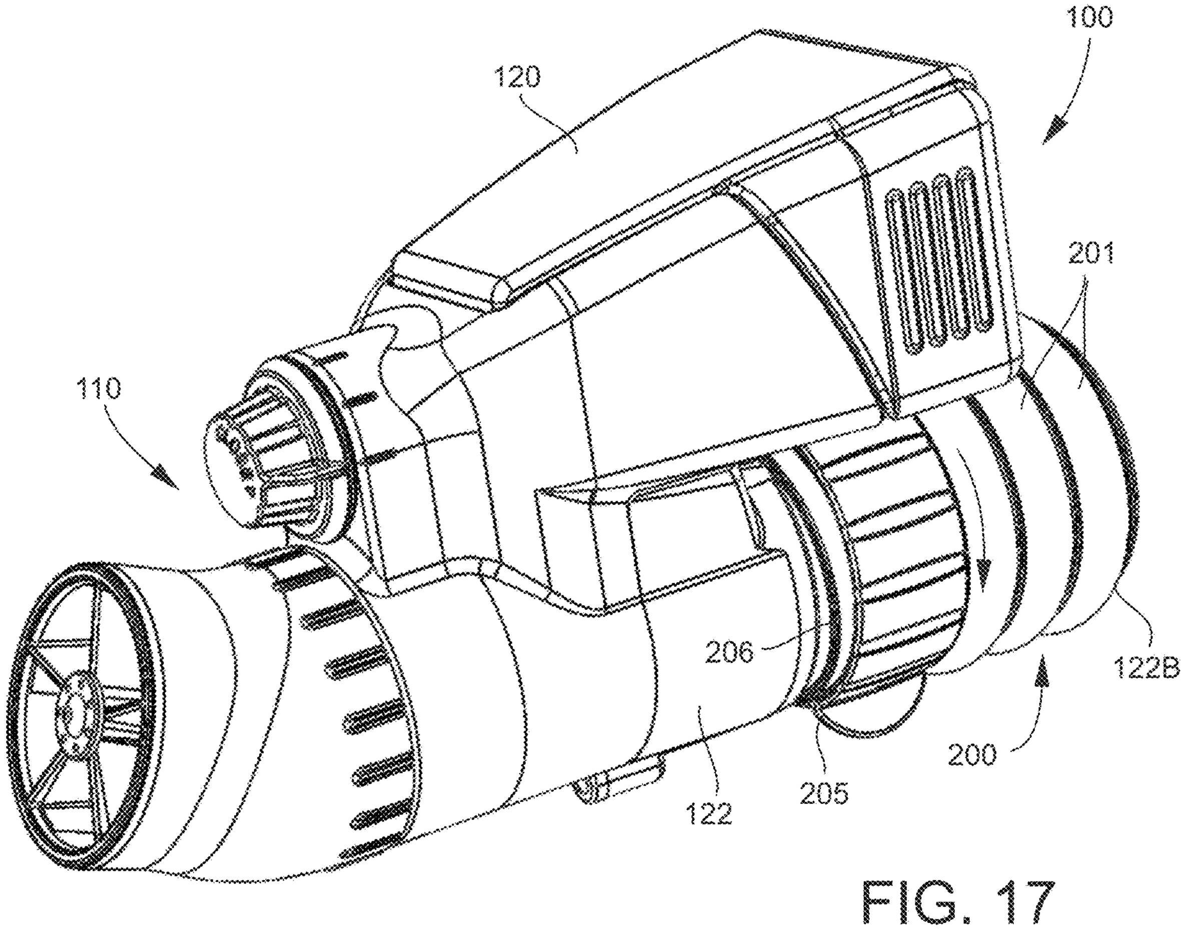
FIG. 17 is a further perspective view the exemplary product applicator and showing the flexible expansion ring assembly in an enlarged-diameter condition.

FIGS. 11 and 12 show the flow regulator 190 in a normally closed condition wherein the first and second seal pins 191, 192 are urged tight against the fixed flow manifold 180 to block the transfer of air into the product storage container 120 and the flow of product outward from the container 120. Rotating the manual control knob 198 moves the flow regulator 190 and seal pins 191, 192 outwardly away from the fixed manifold 180, as shown in FIGS. 13 and 14, thereby allowing transfer of air into the product storage container 120 and the outward flow of product from the container 120. Product (e.g., liquid pesticide) exits the container 120 through the supply conduit 132 to the discharge nozzle 125. From the nozzle 125, the liquid pesticide is captured and entrained in the swirling discharge airflow and broadcast outwardly from the blower/applicator combination to a surrounding area. In one embodiment, the discharge nozzle 125 dispenses the liquid pesticide in the form of very small droplets ranging in average size of 20-30 microns. The small pesticide droplets become entrained and suspended in the outwardly-swirling airflow, and convert into a cyclonic pesticide vapor applicable for destroying a wide range of flying insects.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A combination comprising a portable air blower adapted for supplying a discharge airstream through an elongated blower tube and a product applicator secured to said air blower, wherein said product applicator comprises:

an adapter nozzle assembly located at a distal end of said blower tube, and comprising a substantially hollow housing and a discharge nozzle located inside said housing, and said housing having a discharge end and a connecting end adapted for being arranged inline with the discharge airstream supplied by said air blower;

a product storage container located proximate said housing, and designed for storing a product to be discharged through said discharge nozzle;

an air transfer conduit having a first open end communicating with an inside of said housing upstream of said discharge nozzle, and a second open end extending inside of said product storage container and adapted for residing above a surface of the product stored inside said product storage container;

a supply conduit having a first end fluidly connected to said discharge nozzle inside said housing, and a second open end communicating with the inside of said product storage container at a point below the surface of the product stored inside said product storage container, whereby the discharge airstream passing inline through said housing and across the first open end of said air transfer conduit generates a pressure differential urging the product outwardly from said product storage container through the second open end of said supply conduit to said discharge nozzle;

a flow regulator adapted for selectively adjusting a supply of product from said product storage container through said supply conduit to said discharge nozzle;

said product storage container defining first and second spaced apart flow ports fluidly communicating with said air transfer conduit and said supply conduit;

a hollow air tube located inside said product storage container at the first flow port, and wherein said air tube fluidly communicates with said air transfer conduit to direct a flow of air between the inside of said product storage container and said blower tube;

a fluid release valve located inside said product storage container at the second flow port; and a flow manifold having first and second hollow manifold tubes fluidly communicating with respective first and second flow ports of said product storage container, and wherein one of said first and second manifold tubes automatically opens said fluid release valve upon attachment of said product storage container to said housing.

2. The combination according to claim 1, wherein said flow regulator comprises a first seal pin adapted for selectively controlling the flow of product through said fluid release valve to said supply conduit.

3. The combination according to claim 2, wherein said flow regulator comprises a second seal pin adapted for selectively controlling the flow of air between the inside of said product storage container and said blower tube.

4. The combination according to claim 3, wherein said flow regulator further comprises a manual control knob adapted for selectively and simultaneously moving said first and second seal pins between open and closed positions, thereby controlling a supply of product from said product storage container through said supply conduit to said discharge nozzle.

5. The combination according to claim 1, wherein said supply conduit comprises a flexible hose.

6. The combination according to claim 1, and comprising at least one flexible expansion ring located at the connecting end of said housing and adapted to frictionally engage an inside wall of said blower tube to releasably secure said product applicator to said air blower.

7. The combination according to claim 6, and comprising a rotatable internally-threaded control ring located adjacent said flexible expansion ring and designed to travel along an exterior thread of said housing to selectively compress said flexible expansion ring, thereby adjusting an outside diameter of said flexible expansion ring and selectively urging said flexible expansion ring against the inside wall of said blower tube.

8. The combination according to claim 1, and comprising a plurality of spaced apart radial swirl fins located adjacent said discharge nozzle at the discharge end of said housing.

9. The combination according to claim 1, wherein said product storage container is mounted directly to said housing.

10. A product applicator designed for use with a portable air blower adapted for supplying a discharge airstream through an elongated blower tube, said product applicator comprising:

an adapter nozzle assembly adapted for attachment at a distal end of the blower tube, and comprising a substantially hollow housing and a discharge nozzle located inside said housing, and said housing having a discharge end and a connecting end adapted for being arranged inline with the discharge airstream supplied by the blower;

a product storage container located proximate said housing, and designed for storing a product to be discharged through said discharge nozzle;

an air transfer conduit having a first open end communicating with an inside of said housing upstream of said discharge nozzle, and a second open end extending inside of said product storage container and adapted for residing above a surface of the product stored inside said product storage container; and a supply conduit having a first end fluidly connected to said discharge nozzle inside said housing, and a second open end communicating with the inside of said product storage container at a point below the surface of the product stored inside said product storage container;

whereby the discharge airstream passing inline through said housing and across the first open end of said air transfer conduit generates a pressure differential urging the product outwardly from said product storage container through the second open end of said supply conduit to said discharge nozzle;

a flow regulator adapted for selectively adjusting a supply of product from said product storage container through said supply conduit to said discharge nozzle;

said product storage container defining first and second spaced apart flow ports fluidly communicating with said air transfer conduit and said supply conduit;

a hollow air tube located inside said product storage container at the first flow port, and wherein said air tube fluidly communicates with said air transfer conduit to direct a flow of air between the inside of said product storage container and said blower tube;

a fluid release valve located inside said product storage container at the second flow port; and a flow manifold having first and second hollow manifold tubes fluidly communicating with respective first and second flow ports of said product storage container, and wherein one of said first and second manifold tubes automatically opens said fluid release valve upon attachment of said product storage container to said housing.

11. The product applicator according to claim 10, wherein said flow regulator comprises a first seal pin adapted for selectively controlling the flow of product through said fluid release valve to said supply conduit.

12. The product applicator according to claim 11, wherein said flow regulator comprises a second seal pin adapted for selectively controlling the flow of air between the inside of said product storage container and said blower tube.

13. The product applicator according to claim 12, wherein said flow regulator further comprises a manual control knob adapted for selectively and simultaneously moving said first and second seal pins between open and closed positions, thereby controlling a supply of product from said product storage container through said supply conduit to said discharge nozzle.

14. The product applicator according to claim 10, wherein said flow regulator further comprises a manual control knob adapted for selectively and simultaneously opening and closing said first and second hollow manifold tubes, thereby controlling a supply of product from said product storage container through said supply conduit to said discharge nozzle.

15. The product applicator according to claim 10, and comprising a plurality of spaced apart radial swirl fins located adjacent said discharge nozzle at the discharge end of said housing.

16. The product applicator according to claim 10, wherein said product storage container is mounted directly to said housing.

17. The product applicator according to claim 10, wherein said supply conduit comprises a flexible hose.

18. The product applicator according to claim 10, and comprising at least one flexible expansion ring located at the connecting end of said housing and adapted to frictionally engage an inside wall of said blower tube to releasably secure said product applicator to said air blower.

* * * * *